(12) United States Patent
Bakhsh

(10) Patent No.: US 9,719,841 B2
(45) Date of Patent: Aug. 1, 2017

(54) DYNAMIC NUTRITION TRACKING UTENSILS

(71) Applicant: Umar Rahim Bakhsh, Atlanta, GA (US)

(72) Inventor: Umar Rahim Bakhsh, Atlanta, GA (US)

(*) Notice: Subject to any disclaimer, the term of this patent is extended or adjusted under 35 U.S.C. 154(b) by 159 days.

(21) Appl. No.: 14/790,165

(22) Filed: Jul. 2, 2015

(65) Prior Publication Data

US 2016/0300508 A1 Oct. 13, 2016

Related U.S. Application Data

(63) Continuation-in-part of application No. 14/685,211, filed on Apr. 13, 2015, now Pat. No. 9,146,147.

(51) Int. Cl.
| | |
|---|---|
| *G01G 19/414* | (2006.01) |
| *B26B 3/02* | (2006.01) |
| *G09B 19/00* | (2006.01) |
| *A47G 21/04* | (2006.01) |
| *A47G 21/02* | (2006.01) |
| *G09B 5/02* | (2006.01) |
| *G01G 19/56* | (2006.01) |

(Continued)

(52) U.S. Cl.
CPC ......... *G01G 19/4146* (2013.01); *A47G 21/02* (2013.01); *A47G 21/023* (2013.01); *A47G 21/04* (2013.01); *A47G 23/12* (2013.01); *B26B 3/02* (2013.01); *B26B 11/008* (2013.01); *G01G 19/56* (2013.01); *G09B 5/02* (2013.01); *G09B 19/0092* (2013.01); *A47G 2200/08* (2013.01); *A47G 2200/186* (2013.01); *A47G 2200/22* (2013.01)

(58) Field of Classification Search
CPC .. G01G 19/4146; B26B 11/008; A47G 21/02; A47G 21/04; A47G 23/10; A47G 23/12
See application file for complete search history.

(56) References Cited

U.S. PATENT DOCUMENTS

| | | | |
|---|---|---|---|
| 8,310,368 B2 * | 11/2012 | Hoover | A61B 5/1123 340/573.1 |
| 8,363,913 B2 * | 1/2013 | Boushey | G06K 9/00 128/921 |

(Continued)

FOREIGN PATENT DOCUMENTS

| | | | |
|---|---|---|---|
| WO | WO 2015/170244 A1 * | 11/2015 | |
| WO | WO 2016204543 A1 * | 12/2016 | A47G 21/04 |

Primary Examiner — John Villecco

(57) ABSTRACT

Systems, methods, and computer-readable media are disclosed for dynamic nutrition tracking with utensils. Example methods may include receiving an image of a first food item positioned at a first location and a second food item positioned at a second location, the image comprising location metadata, determining, based at least in part on the image and the location metadata, a first set of coordinates corresponding to a first perimeter of the first location of the first food item, and determining a second set of coordinates corresponding to a second perimeter of the second location of the second food item. Example methods may include determining that a utensil performed a gesture associated with a food consumption event, determining that an origination point of the food consumption utensil at a start of the gesture was within the first perimeter, and identifying a weight measurement of a food portion on the utensil.

18 Claims, 11 Drawing Sheets

(51) Int. Cl.
*A47G 23/12* (2006.01)
*B26B 11/00* (2006.01)

(56) References Cited

U.S. PATENT DOCUMENTS

| | | | |
|---|---|---|---|
| 9,042,596 B2* | 5/2015 | Connor | G06K 9/00771 348/158 |
| 2006/0087831 A1* | 4/2006 | Kramer | A47G 19/025 362/101 |
| 2007/0098856 A1* | 5/2007 | LePine | A47G 21/02 426/231 |
| 2009/0253105 A1* | 10/2009 | Lepine | A47G 21/00 434/127 |
| 2010/0109876 A1* | 5/2010 | Schmid-Schonbein | G06F 19/3475 340/573.1 |
| 2010/0125418 A1* | 5/2010 | Hyde | A47G 21/00 702/19 |
| 2010/0240962 A1* | 9/2010 | Contant | A47G 21/02 600/300 |
| 2012/0115111 A1* | 5/2012 | Lepine | A47G 21/00 434/127 |
| 2013/0157232 A1* | 6/2013 | Ehrenkranz | G01G 19/4146 434/127 |
| 2013/0203024 A1* | 8/2013 | Dekar | B25J 11/008 434/127 |
| 2014/0315160 A1* | 10/2014 | Hayashi | G09B 19/0092 434/127 |
| 2014/0347491 A1* | 11/2014 | Connor | A61B 5/1114 348/158 |
| 2015/0179086 A1* | 6/2015 | Kim | G09B 19/24 434/260 |
| 2016/0066724 A1* | 3/2016 | Cowley | A47G 21/02 702/130 |
| 2016/0372004 A1* | 12/2016 | Pathak | G09B 19/0092 |

* cited by examiner

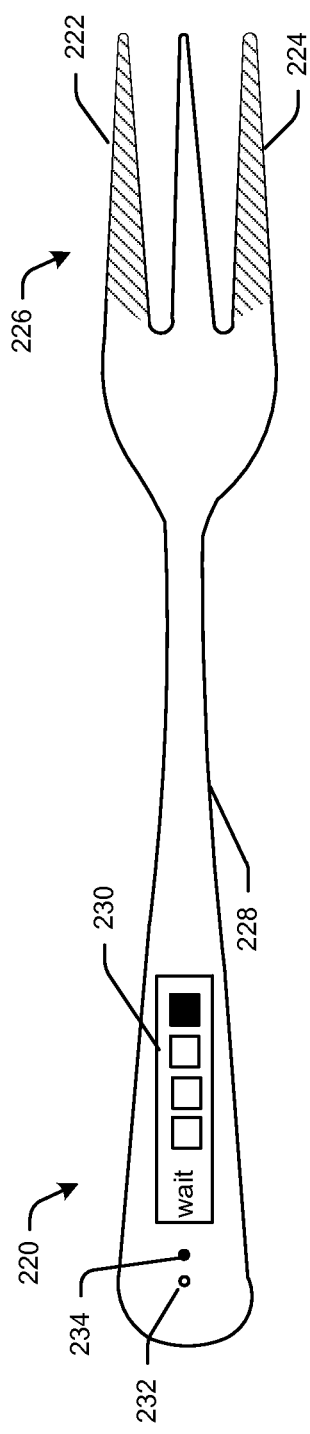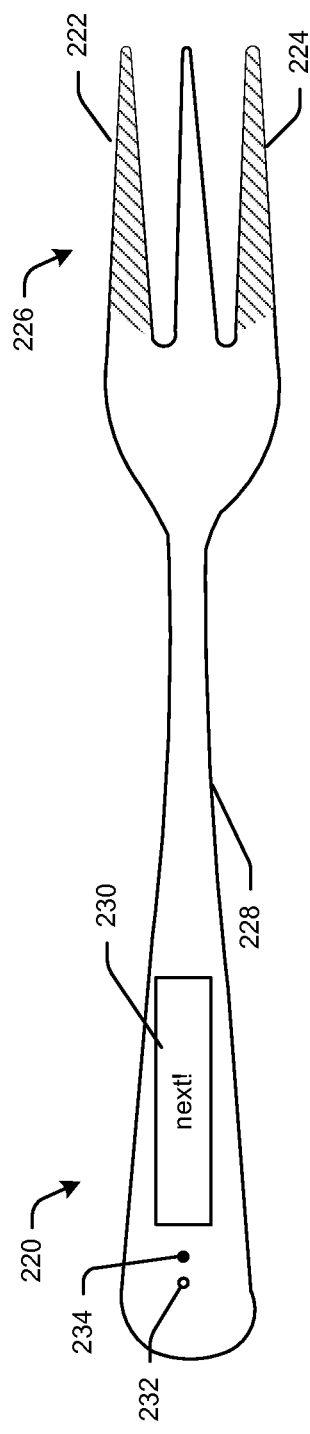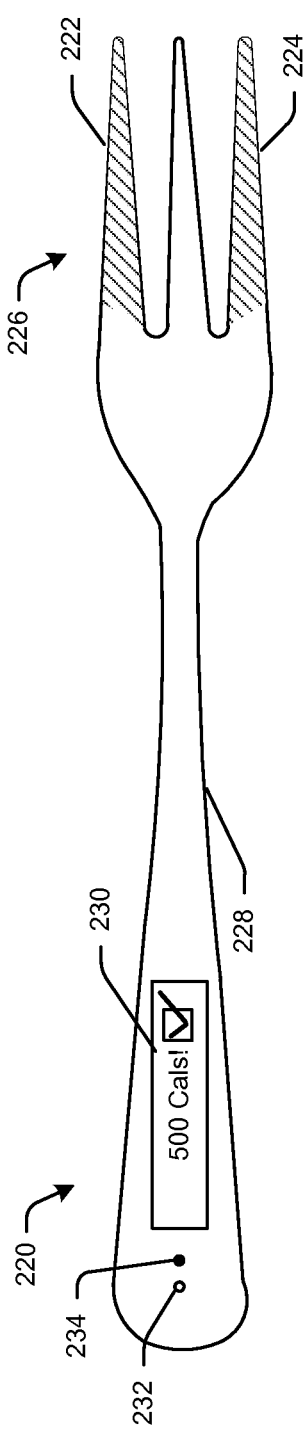

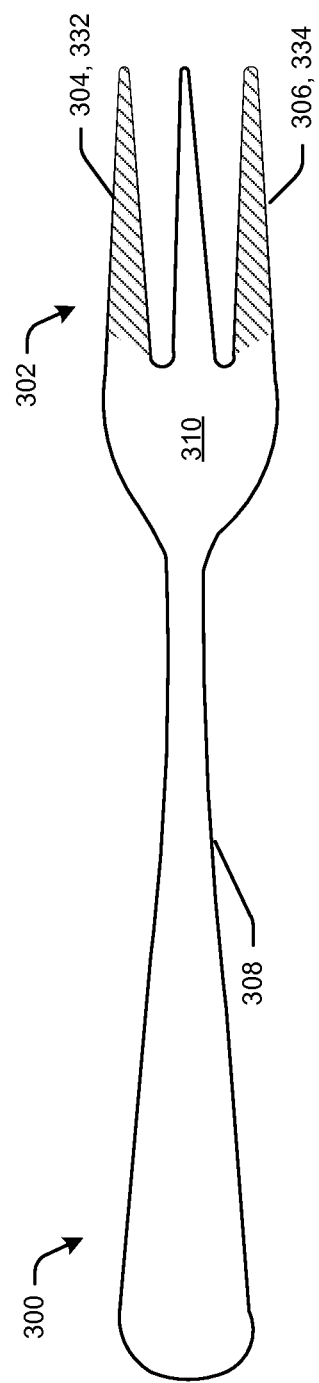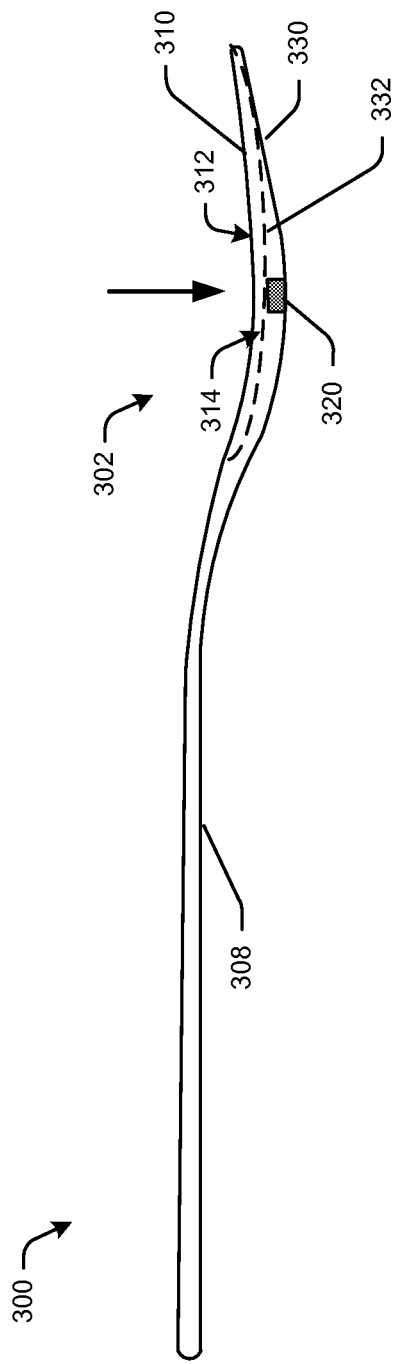

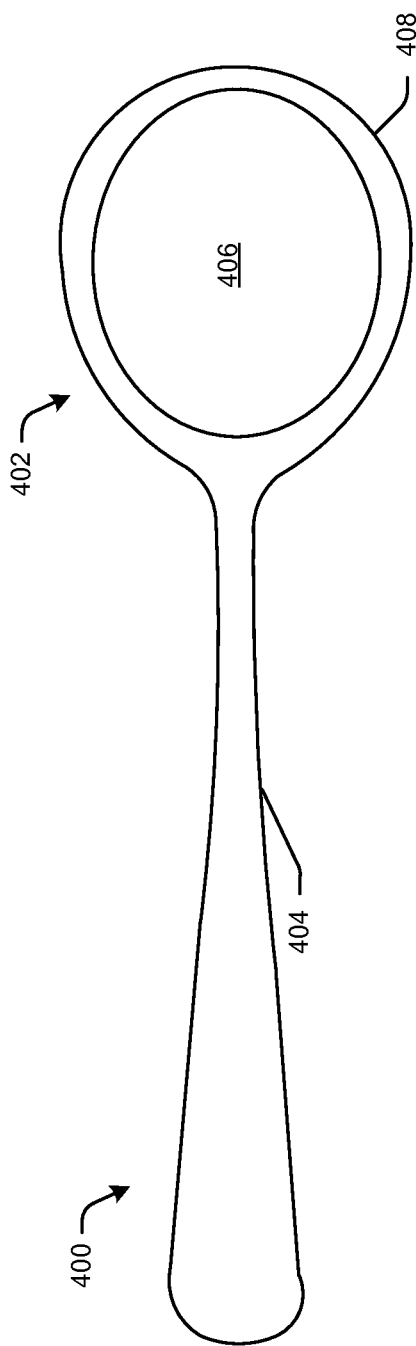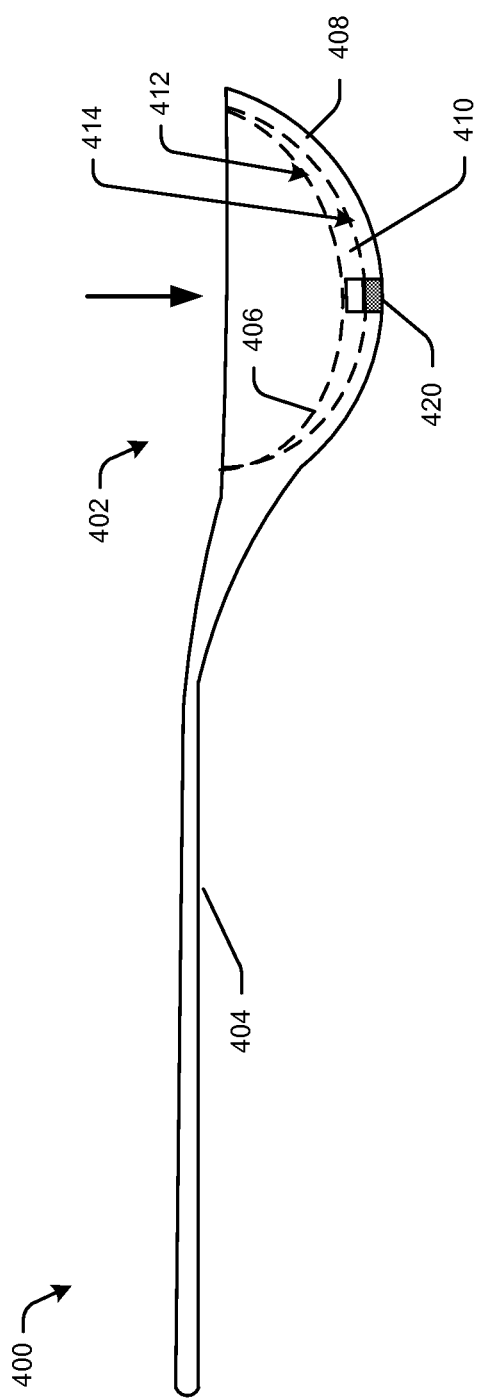

US 9,719,841 B2

DYNAMIC NUTRITION TRACKING UTENSILS

RELATED APPLICATIONS

This application is a continuation-in-part of U.S. application Ser. No. 14/685,211, filed Apr. 13, 2015.

BACKGROUND

Consumable foods have varying nutritional content. Nutritional content for certain food items may be provided, for example, on packaging of a food item. In some instances, nutritional content provided to consumers may be cumbersome to use because the consumer may be unaware of a consumed amount of the food item. Further, consumers may be unable to determine an amount of a food item that the consumer actually consumed, regardless of whether the consumer is aware of the nutritional content of the consumed food item. As a result, consumers may be unable to determine nutritional content or other information of consumed foods.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In some of the drawings, the left-most digit(s) of a reference numeral may identify the drawing in which the reference numeral first appears. The use of the same reference numerals indicates similar, but not necessarily the same or identical components. Different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIGS. 3-5 illustrate example feedback presented on an optional display of a smart utensil in accordance with one or more example embodiments of the disclosure.

FIGS. 6-11 illustrate example smart utensils in various configurations in accordance with one or more example embodiments of the disclosure.

DETAILED DESCRIPTION

Overview

Figure 1:
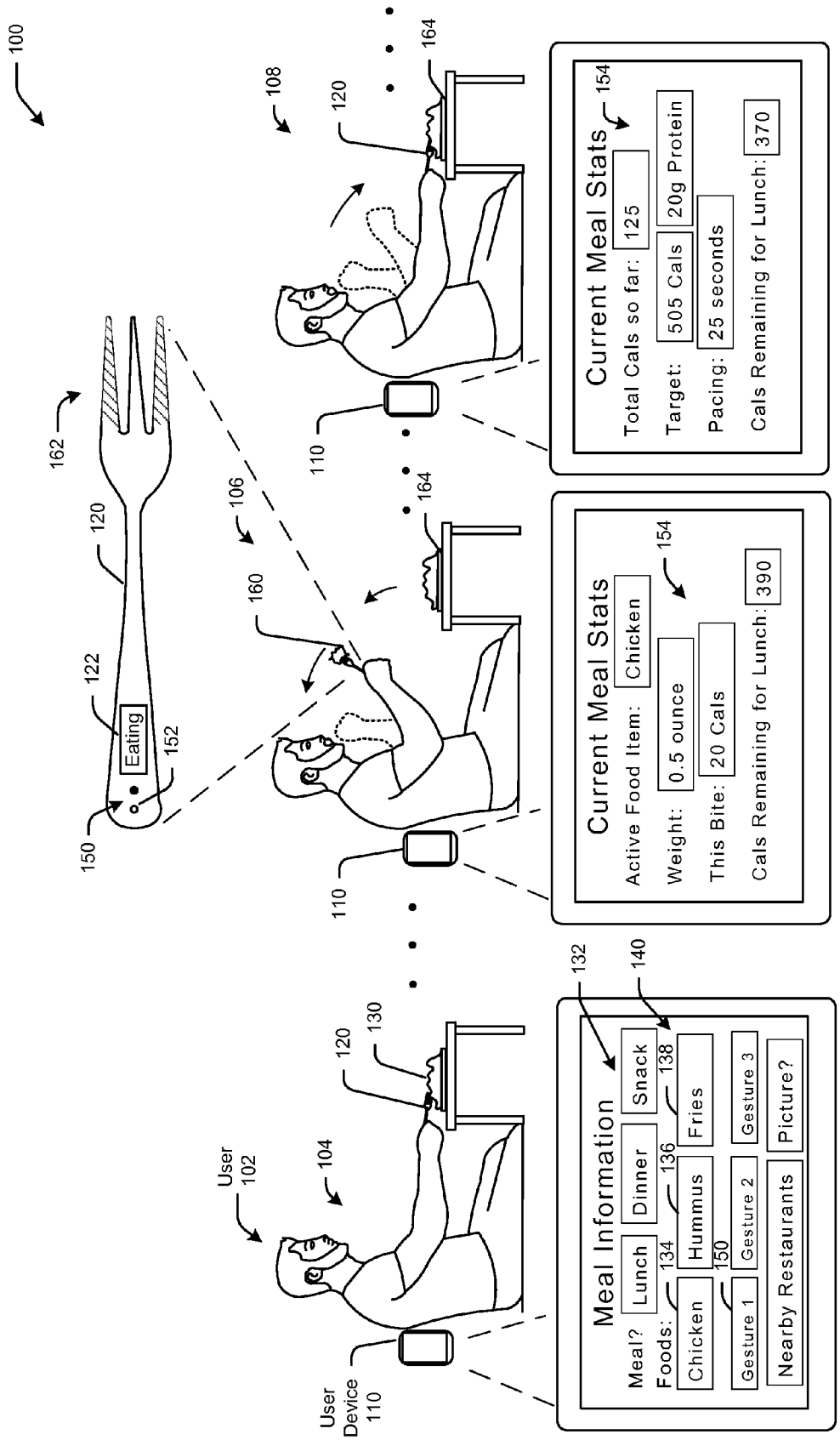
FIG. 1 is a schematic diagram of an example use case illustrating gestures initiating and completing a food consumption event and dynamically tracking nutrition information in accordance with one or more example embodiments of the disclosure.

This disclosure relates to, among other things, systems, methods, computer-readable media, techniques, and methodologies for dynamic nutrition tracking and dynamic nutrition tracking utensils. Consumers may use utensils to consume food items. Consumers may desire to monitor or otherwise track nutritional content and/or accurate portion information of food items that the consumer actually consumes. For example, a consumer may desire to consume 1,500 calories or less in any given 24 hour period. The consumer may therefore desire to track an accurate number of calories consumed during a particular meal event or a food consumption event, such as a bite of food, so as to determine whether the consumer has exceeded the desired calorie goal. Consumers may further desire to monitor and/or adjust a pacing at which consecutive portions of food items are consumed. Pacing of food consumption may affect an overall amount of food consumed by the consumer. In one example, a consumer following a specific diet to lose weight may desire a gap of 30 seconds between consecutive bites of food, which may result in a reduced amount of food consumed relative to shorter gaps.

Embodiments of the disclosure may be configured to generate accurate nutritional content information for food consumption events or meal events by measuring weights of portions of food that are actually consumed by a consumer. Certain embodiments may facilitate pacing of food consumption by monitoring or tracking a length of time between consecutive food consumption events and generating indications to the consumer upon completion of a food consumption pacing interval, which may be set by the consumer or automatically determined in some embodiments. Consumers may receive the generated indications and proceed with a subsequent food consumption event. Certain embodiments of the disclosure may further facilitate consumer goals by analyzing historical data associated with a user account of the consumer. For example, embodiments may automatically reduce a target number of calories for a consumer that has a goal of weight loss. Embodiments may determine that the consumer has a desired meal event calorie goal of 600 calories. After the consumer has met the desired meal event calorie goal for a certain number of meal events, or after a predetermined length of time has passed from initiation of the desired meal event calorie goal, embodiments of the disclosure may automatically adjust (e.g., reduce, increase, etc.) or suggest an adjustment or reduction of the desired meal event calorie goal to a different meal event calorie goal, such as 575 calories. Adjustments to the desired meal event may be determined as a percentage of the initial desired meal event calorie goal, or an adjustment of a particular number of calories. Alternately, if a consumer is unable to meet a desired meal event calorie goal, embodiments of the disclosure may suggest an increase in the desired meal event calorie goal to facilitate participation and prevent disinterest of the consumer in using a smart utensil or user device of the disclosure. Embodiments of the disclosure include utensils, such as spoons, forks, knives, and other utensils, that may be configured to determine a weight of food loaded on the utensil. Consumers may use the utensils to consume food, which may provide accurate weight measurements of food items that are actually consumed by the consumer, as opposed to food items on a plate that a consumer may have intended to consume. Embodiments may further determine food items that are loaded on the utensils and may generate nutritional information, such as calorie information and nutrient information, based at least in part on the measured weights of the food items. Embodiments may further identify food consumption events and food items based at least in part on gestures performed with the utensils by consumers, as described herein.

For example, embodiments of the disclosure may present one or more prompts to a user for training of certain gestures. The prompts may include a request for the user to raise a utensil from a table to the user's mouth to mimic eating a bite of food, or a food consumption event, which may be tracked using a motion sensor (e.g., accelerometer, compass, gyroscope, barometer, etc.) of the utensil. The prompt may be repeated to establish a first gesture baseline (with a tolerance) for food consumption events for the user. Similarly, a second gesture baseline may be established for bringing the utensil from the user's mouth back to the table to determine completion of a food consumption event. In some embodiments, completion of food consumption events may be determined by a change in weight of the food portion on the utensil, or a change in weight may be considered in conjunction with the second gesture baseline to determine completion of a food consumption event (e.g., food portion weight changing from 0.25 ounces to 0 ounces may indicate the user consumed the food). Other gestures, as described herein, may include, but are not limited to, gestures configured to identify one or more particular food items, to activate or move certain food items to an active state, and other functions.

Referring now to FIG. 1, an example environment 100 is illustrated with a user 102, a user device 110, and a smart utensil 120, in accordance with one or more embodiments of the disclosure. At a first event 104, the user 102 may have food 130 that the user 102 desires to consume during a meal event. A meal event may include one or more food consumption events, during which a user brings food to his or her mouth or otherwise indicates an intent to consume a portion of a food item. The user 102 may initiate a meal event at the user device 110 by providing one or more inputs of food items 132 included in the food 130 that the user 102 may consume. For example, the user 102 may select a first food item 134 of grilled chicken, a second food item 136 of classic hummus and a third food item 138 of french fries. In some embodiments, the user 102 may initiate a meal event and/or input food items by performing one or more gestures or selecting one or more inputs at the smart utensil 120, or via one or more inputs at another user device 110, such as a laptop, tablet, remote server, wearable device (e.g., watch, wristband, glasses or optical gear, headphones, etc.) or other device. Food items 132 may be selected from a set of one or more food items which may be predicted based at least in part on an image analysis, or may be manually input by the user 102.

In some embodiments, the user 102 may select the food items 132 that the user 102 may consume during a meal event based at least in part on predicted food items presented by systems of the disclosure. For example, the user device 110 and/or the smart utensil 120 may generate predicted food items 140 based at least in part on a geographic location of the respective device 110, 120 and/or based at least in part on historical data of food items consumed by the user 102. In generating predicted food items 140, embodiments may consider a time of day in addition to previously selected food items to generate predictions. If the user 102 selects or inputs yogurt on a majority of days a week between 3:00 pm and 5:00 pm, on a subsequent day embodiments may predict that the user 102 will input yogurt during 3:00 pm and 5:00 pm, and may present the predicted food item(s).

Food items 132 may further be selected from a set of food items generated by the user device 110 or smart utensil 120 based at least in part on geographic location of either or both the user device 110 or smart utensil 120. For example, the user device 110 may determine that the location of the user device 110 is associated with or in proximity to a particular restaurant, and as a result, the user device 110 may predict food items from a menu associated with the restaurant that is in proximity. The user device 110 may present the menu items to the user 102 for selection.

In some embodiments, food items 132 may be selected based at least in part on image analysis. For example, the user 102 may take a picture or capture an image of the food 130. Embodiments of the disclosure may analyze the image to recognize one or more food items of the food 130, and may present the identified or recognized food items to the user 102. Embodiments of the system may provide a user interface for the user 102 to draw or identify boundaries of one or more food items of the food 130. For example, the user 102 may take a picture with the user device 110 and may circle different food items on a display of the user device 110. Embodiments of the disclosure may generate location information, for example via analysis of metadata associated with the image and the user inputs identifying the food items to determine a location or relative location of food items to the user device 110 or user 102. As described herein, embodiments may generate geofences based at least in part on the image and/or one or more user inputs to determine which food item the user 102 is eating at a given time.

The user device 110 or smart utensil 120 may associate each of the selected food items 132 with a particular input indicative of the respective food item, thereby facilitating identification of food items that the user 102 consumes with the smart utensil 120. For example, the user device 110 may prompt the user 102 to associate the first food item 134 with a first input 150. The first input 150 may be an input at the user device 110 or at the smart utensil 120. The first input may be, in certain embodiments, associated with a first button 152 at the smart utensil 120. For example, the user 102 may select the first button 152 before or while preparing to consume the first food item 134. The first button 152 may be a manually configurable button, such as a depressible button, or may be a touch-sensitive or pressure sensitive button or sensor configured to receive user input. In some embodiments, the first input 150 may be associated with a particular gesture. For example, a gesture movement of left or right of the smart utensil 120 may be indicative of the first food item 134, while a gesture movement towards or away from the user 102 may be associated with another food item. Accordingly, the user 102 may be able to consume the food 130 with the smart utensil 120 and/or without continuous operation or interaction with the user device 110. The user device 110 or smart utensil 120 may associate the second food item 136 with a second input, which may be another button, gesture, or other input, and may associate the third food item 138 with a third input.

In some embodiments, food items may be associated with specific areas or geofences of an eating surface upon which the food 130 is placed, and location tracking of the smart utensil 120 may be used to identify food items, as described herein. For example, the user 102 may take a picture of the food 130 and may identify a center of the food, an outer boundary of the food, and/or boundaries around one or more food items of the food. Based at least in part on the image, metadata associated with the image, and one or more user inputs or results of image processing, locations of food items and identification of food items may be generated.

The user 102 may use the smart utensil 120 to consume portions of the food 130. The smart utensil 102 may be a food consumption utensil, as described herein. At a second event 106, which may be after the food items 132 are associated with inputs, the user 102 may consume portions of the food 130 by placing a portion 160 of the food on a food delivery portion or food delivery surface 162 of the smart utensil 120. In some embodiments, prior to or during placement of the portion 160 of the food on the food delivery surface 162, the food may be identified. As described, the food may be identified in some embodiments by an input at the smart utensil 120, such as via a button or gesture. In FIG. 1, the user 102 may desire to consume a portion of grilled chicken during a food consumption event. The user 102 may identify the grilled chicken, which is the first food item 134 in this example, by performing a gesture swipe to a right side of a plate 164 the food 130 is on. Upon determining that the gesture associated with the grilled chicken was performed, the smart utensil 120 and/or user device 110 may designate the grilled chicken food item to an active state. For example, the grilled chicken food item may be in an inactive state upon selection as a food item, and may be moved or configured to an active state upon the input associated with the grilled chicken. The smart utensil 120 may provide an indication to the user 102 that the first food item is active. Indications may be vibrational/haptic feedback or visual indicators, such as light emitting diodes or other lights, at the smart utensil 120 or the user device 110.

The user 102 may load the portion 160 of grilled chicken onto the food delivery surface 162 and may initiate a food consumption event by raising the food delivery surface 162 of the smart utensil 120 to the user's mouth. The smart utensil 120 may determine, at some threshold length or movement between the eating surface and the user's mouth (which may be determined based at least in part on baseline tests or diagnostics initially performed by the user) that the food consumption event is taking place and may initiate a food consumption event.

Upon determining that a food consumption event is initiated, the smart utensil 120 may trigger or otherwise obtain a weight measurement of the portion 160 of food on the food delivery surface 162. In one embodiment, a weight sensor may be positioned about the food delivery surface 162 configured to determine a weight of food at or on the food delivery surface 162. The weight sensor may be triggered to generate a weight measurement during a food consumption event.

The user 102 may consume the portion 160 of food. The smart utensil 120 may determine that the user 102 consumed the portion 160. For example, the smart utensil 120 may determine, based on feedback from the weight sensor, that a weight of food on the food delivery surface 162 changed from a first number or first measured weight that is greater than 0 to 0 or substantially 0. The smart utensil 120 may determine that the user 102 therefore consumed the portion 160 of food. In some embodiments, the smart utensil 120 may use indications of gestures to determine that a food consumption event is complete. For example, at a third instance 108, the user 102 may bring the smart utensil 120 away from his or her mouth and back to the eating surface 164. Based at least in part on the gesture associated with the motion of the user 102 returning the smart utensil 120 to the eating surface 164 after a food consumption event has been initiated, the smart utensil 120 may determine that the food consumption event is complete.

Upon determining that the food consumption event is complete, the smart utensil 120 and/or the user device 110 may determine or generate nutritional information 154 of the portion 160 of food consumed by the user 102, based at least in part on the weight of the portion 160. In some instances, the smart utensil 120 may determine more than one weight measurement during a food consumption event. For example, food may fall off the food delivery surface 162. In such instances, the smart utensil 120 may generate multiple weight measurements and use the most recent weight measurement, or weight measurement immediately preceding completion of the food consumption event (e.g., immediately or just before or most recent measurement before weight measurement went to 0), to generate nutritional information.

Nutritional information may include calorie information, such as amount or number of calories, vitamin information, protein information, carbohydrate information, "point" value (e.g., food metrics based on nutritional value of particular food items, etc.) and other nutritional information. To generate nutritional information associated with a food consumption event, the smart utensil 120 or user device 110 may identify nutritional information associated with the food item that was consumed during the food consumption event. For example, in FIG. 1, nutritional information associated with grilled chicken, the first food item 134, may be identified by embodiments of the disclosure. The nutritional information may be converted into a weight based format. For example, grilled chicken nutritional information may indicate 1 ounce of grilled chicken has 100 calories and 10 grams of protein. The smart utensil 120 or user device 110 may determine nutritional information for the food consumption event based at least in part on the nutritional information of the food item and the measured weight. For example, in FIG. 1, the portion 160 may have a weight of 0.5 ounces and may be the first food item 134. As a result, the smart utensil 120 may determine nutritional information of 50 calories and 5 grams of protein, or, in some embodiments, 1 "point" value, associated with the food consumption event. In instances where the user 102 eats multiple food items in a single food consumption event, embodiments of the disclosure may generate a blended nutritional information value to associate with the food consumption event based at least in part on the nutritional information of the respective food items and a relative density of the food items with respect to each other. In one example, a user consuming cereal and milk may input a cereal and a milk, and embodiments of the disclosure may generate a blended nutritional information value based at least in part on density and/or other properties of the cereal and milk.

The smart utensil 120 may wirelessly communicate, for example via a BLUETOOTH™ or other wireless connection, information to and from the user device 120. The user device 120 may present real-time nutritional information to the user 102 during a meal event based at least in part on feedback received from the smart utensil 120. In some embodiments, the smart utensil 120 may include a display 122 at which information may be presented to the user 102.

Upon completion of a food consumption event, the smart utensil 120 may generate a timestamp and/or begin a timer based at least in part on a food consumption pacing interval. The food consumption pacing interval may be set by the user 102. For example, the user 102 may desire to wait 1 minute between consecutive food consumption events. The smart utensil 120 may determine that the food consumption pacing interval is complete, and may generate an indication to the user 102 that the user 102 is free to proceed with another food consumption event. The generated indication may be vibrational or visual feedback in some embodiments.

The smart utensil 120 and/or user device 110 may generate a real time total nutritional information count or report of food consumed during a meal event. In some embodiments, upon meeting a certain nutritional threshold, such as a calorie threshold or protein gram threshold, the smart utensil 120 and/or user device 110 may generate a notification or indication. For example, the smart utensil 120 may determine that the user 102 has a target total calorie amount of 500 calories for a meal event. Upon determining that the meal event nutritional information, which includes nutritional information of the food consumption events during the meal event, meets the target total calorie amount of 500 calories, the smart utensil 120 may generate a notification, such as vibrational feedback. The user 102 may then complete the meal event.

Upon determining that the meal event is complete, the smart utensil 120 and/or user device 110 may generate a meal event report including pacing information, food item information of the selected food items, food consumption event information including weight and calorie information, and other information. The meal event report may be presented to the user and stored as historical data locally, or may be sent to a remote server for storage and/or further processing (e.g., comparisons to previous meal events to generate eating trends, etc.).

While example embodiments of the disclosure may be described in the context of food consumption utensils and user devices, it should be appreciated that the disclosure is more broadly applicable to any suitable user device including, without limitation, a smartphone, a tablet, a wearable device, a video game console, other utensils such as bowls, plates, and dishware, or any other suitable device.

Example embodiments of the disclosure provide a number of technical features or technical effects. For example, in accordance with example embodiments of the disclosure, nutritional information for food items that are consumed may be dynamically generated and monitored or tracked. Feedback provided to users may facilitate achievement of certain goals or targets. Dynamic weight measurements and/or nutritional content information may be generated and analyzed to provide real-time feedback and accurate data and metrics specific to individual users. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Apparatuses and Use Cases

Figure 2:
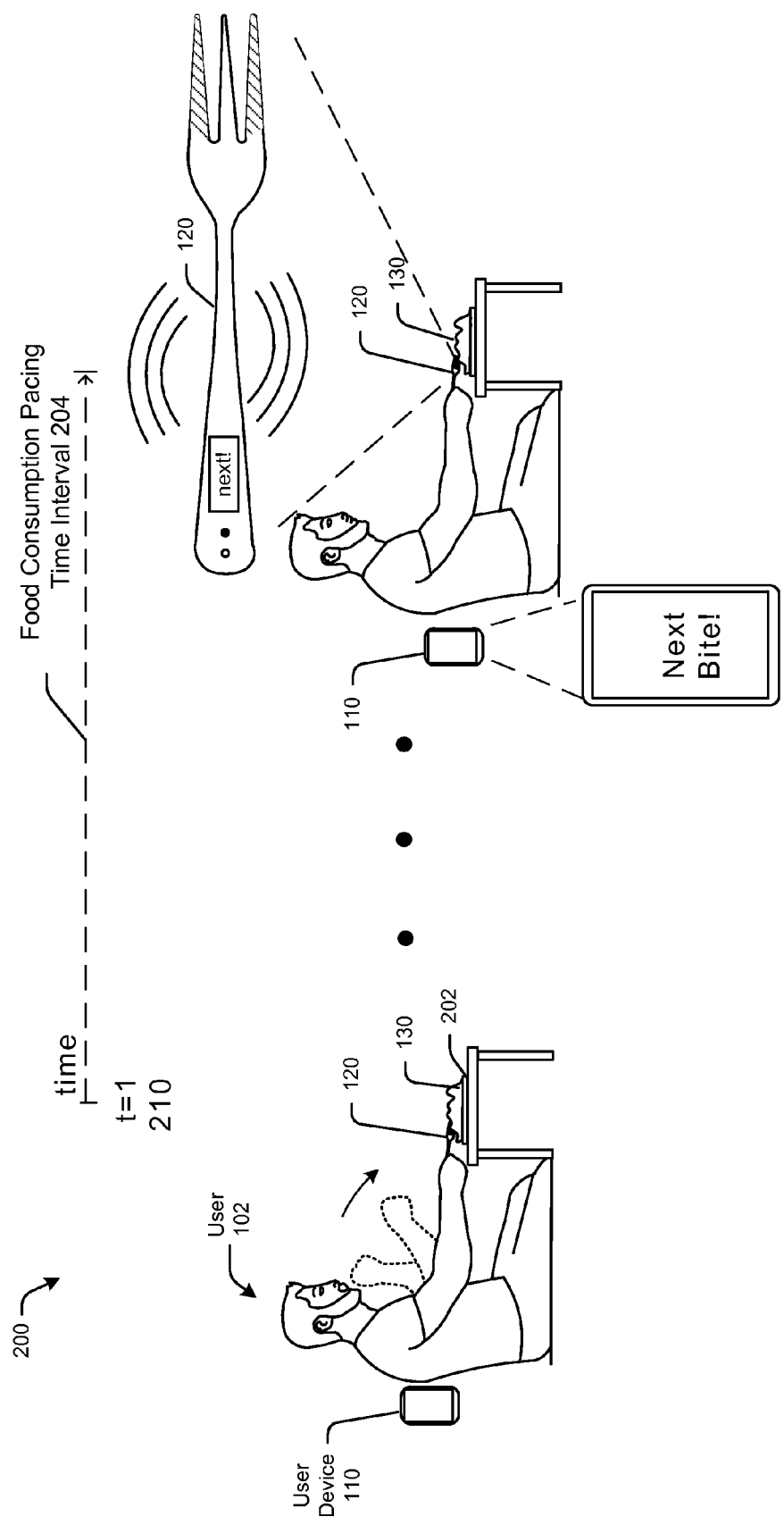
FIG. 2 is a schematic diagram of an example use case illustrating a food consumption pacing interval in accordance with one or more example embodiments of the disclosure.

FIG. 2 illustrates an example use case 200 for dynamic pacing of food consumption in accordance with one or more example embodiments of the disclosure. FIGS. 3-5 illustrate an example embodiment of a smart utensil as described herein, and will be discussed in conjunction with the description of FIG. 2.

In FIG. 2, the user 102 may initiate and complete a food consumption event. Completion of the food consumption event may be determined as described herein. For example, a smart utensil may receive an indication of a gesture indicating that the user 102 has returned the smart utensil to an eating surface 202 after initiating a food consumption event, or by detecting a change in weight at a food delivery surface of the smart utensil. Upon determining that the food consumption event is complete, the smart utensil may generate a first timestamp 210 and may initiate a timer or otherwise track a length of time from the first timestamp 210. The smart utensil may identify a food consumption pacing time interval 204 associated with a meal event. The food consumption pacing time interval may be indicative of a desired length of time between consecutive food consumption events. The food consumption pacing interval may be set by the user 102 or automatically determined by the smart utensil. Upon completion of the food consumption pacing time interval 204, the smart utensil may generate a notification or indication to the user 102 that the food consumption pacing time interval 204 is complete, such as via a vibration or other alert at the user device 110 or smart utensil.

In FIG. 3, an example embodiment of a smart utensil 220 as described herein is depicted. The smart utensil 220 may include a first time 222, a second time 224, a food delivery surface 226, and a member 228 extending from the food delivery surface 226. The smart utensil 220 may include a display 230, a first input 232, and a second input 234. The first and second inputs 232, 234 may be associated with power options, food item identification inputs, or other options. Upon generating the first timestamp 210 in FIG. 2, the smart utensil 220 may present an indication to the user 102 to wait before proceeding with another food consumption event. As shown in the example of FIG. 3, the smart utensil 220 may present a message at the display 230, which may include a graphical indicator of time remaining before the food consumption pacing interval is complete.

Referring back to FIG. 2, upon determining that the food consumption pacing interval is complete, the smart utensil may generate a pacing notification, or an indication or feedback, to indicate that the user 102 may proceed with another food consumption event. As illustrated, the smart utensil may vibrate or provide another indication. In FIG. 4, the smart utensil 220 is illustrated presenting a message to the user 102 at the display 230, indicating that the user 102 may proceed and/or that the food consumption pacing interval is complete.

In FIG. 5, the smart utensil 220 may continue to provide feedback or indications to the user 102 during a meal event, for example, upon determining that a target calorie goal has been met, the smart utensil 220 may provide an indication at the display 230 that the target calorie goal has been met.

Embodiments of the disclosure may facilitate tracking food consumption based at least in part on target food consumption goals. As described herein, users may desire to consume certain amounts of nutrition in certain time periods or during certain meal events. Target goals may be set by users, and/or may be automatically determined or adjusted by systems of the disclosure. In one example method of determining whether target calorie goals have been met, a user device, such as the smart utensil 220, may determine a target total consumed calorie amount associated with a first meal event, and may add a first consumed calorie amount and a second consumed calorie amount to generate a preliminary consumed calorie amount during a meal event. The user device may compare the preliminary consumed calorie amount to the target total consumed calorie amount, and may determine that the preliminary consumed calorie amount is equal to or greater than the target total consumed calorie amount, and as a result, may generate a target consumption notification. If the user device determines that the total consumed calorie amount is less than the target total consumed calorie amount, the user device may adjust the target total consumed calorie amount for a second meal event based at least in part on a difference between the total consumed calorie amount and the target total consumed calorie amount. For example, if the user is 200 calories below a target or greater than or equal to 10% below the target, the target may be too easy for the user, or vice versa, in that the target may be too difficult if the user continually exceeds the target.

In one example, a target meal event total calorie goal may be determined by the user device or by a remote server as being a goal set by a user. In some instances, the target meal event total calorie goal may be an incremental adjustment or increase from an average meal event calorie goal for the user or a most recent meal event calorie goal, or combination thereof, to bring a current meal event calorie amount closer to the target meal event total calorie goal. For example, a user may have a target meal event total calorie goal of 500 calories for breakfast. The user may have consumed an average of 800 calories for breakfast over the last week, with a most recent breakfast calorie amount of 900 calories. Accordingly, the user device may determine that the target meal event total calorie goal of 500 is too high and may adjust the target to 750 calories to encourage to user to comply with the target. In another example, a user may have a target meal event total calorie goal of 600 calories for lunch, and may have an average lunch calorie amount of 620 calories historically. However, over the most recent three lunches, the user may have had respective calorie counts of 575, 570, and 545. As a result, the user device may determine that the target meal event total calorie goal may be reduced from 600 calories to 540 calories, or a 10% reduction, to encourage the user to improve and/or achieve a desired weight loss goal. Recommended target meal event total calorie goals may be determined or generated by the user device by analyzing targets of other users that may have user attributes similar to the user (e.g., age, height, weight, desired weight loss, and other metrics of users with similar user attributes, etc.).

FIGS. 6-11 illustrate additional example embodiments of smart utensils in accordance with one or more embodiments of the disclosure. Referring first to FIGS. 6-7, an example embodiment of a smart fork 300 is depicted in accordance with one or more embodiments of the disclosure. The smart fork 300 may include a food delivery portion 302 with a first time 304 and a second time 306. A handle 308 may extend from the food delivery portion 302. A food delivery surface 310 may be one of the surfaces of the food delivery portion 302, such as an upper or "top" surface relative to other surfaces of the food delivery portion 302 ("top" is not necessarily referred to herein as an absolute position). The smart fork 300 may include one or more weight sensors 320 positioned at the food delivery portion 302, or otherwise configured to determine a weight of items positioned on or at the food delivery surface 310. For example, the weight sensor 320 may be positioned in a gap 322 between the food delivery surface 310 and a lower surface 330 of the food delivery portion 302. The weight sensor 320 may be positioned in the handle 308 in other embodiments. In some embodiments, the weight sensor 320 may be positioned in a removable sleeve or cover positioned over the smart fork 300.

The weight sensor 320 may be any suitable weight sensor, mass sensor, force sensor, load sensor, load cell, or other sensor configured to determine a weight at the food delivery surface 310. Additional examples include transducers configured to convert mechanical force inputs to electrical signal outputs. Weight sensors used herein may be configured to measure or determine tension and/or compression loads.

The food delivery surface 310 may be configured to move, flex, or shift relative to the lower surface 330 of the food delivery portion 302, as illustrated in FIG. 7. Accordingly, upon placing food items on the food delivery surface 310, the weight sensor 320 may be depressed or compressed by the food delivery surface 310, or may otherwise receive a force, and may generate a weight measurement based at least in part on the force applied at the weight sensor 320 by the food delivery surface 310. In FIG. 7, the food delivery surface 310 may be moved from an initial position 312 to a depressed or compressed position 314 when loaded with food items. One or more springs 330 may be positioned in the gap 322 so as to assist the food delivery surface 310 in returning to the initial position 312 after the food item is removed from the food delivery surface 310. Based at least in part on spring properties of the spring (in embodiments that include the spring), and feedback from the weight sensor, a weight of food items loaded on the food delivery surface 310 may be determined.

As illustrated in FIG. 6, the first time 304 and/or the second time 306 may be configured to receive one or more inputs. The first time 304 may be a first color 332 and the second time 306 may be a second color 334 that is different than the first color 332. The first time 304 and the second time 306 may be configured to receive touch and/or pressure inputs and may be configured to identify food items. For example, the first time 304 may be associated with a first food item and the second time 306 may be associated with a second food item. A user may use the first time 304 to initiate a food consumption event of the first food item, and the second time 306 to initiate a food consumption event of the second food item. For example, by depressing a portion of the first time 304, or by applying pressure to a surface of the first time 304, the first food item may be moved to an active state for a food consumption event. In other embodiments, side surfaces or top or bottom surfaces may be configured to receive inputs and may be associated with food items. In some embodiments, a surface of the smart fork 300 that receives pressure or contact first may be the surface for which a food item is identified, so that a user can use the entire food delivery surface 310, but may identify the food item by leading with the applicable surface (e.g., contact with first time 304 before second time 306 may identify first food item, although both times may receive pressure or contact, etc.).

Referring to FIGS. 8-9, an example embodiment of a smart spoon 400 is depicted in accordance with one or more embodiments of the disclosure. The smart spoon 400 may include a food delivery portion 402 and a handle 404 extending from the food delivery portion 402. The food delivery portion 402 may include a food delivery surface 406 and an outer surface 408 separated by a gap 410. The food delivery surface 406 may be configured to move with respect to the outer surface 408. For example, the food delivery surface 406 may move, flex, or shift from an initial position 412 to a second position 414 upon being loaded with food items. The smart spoon 400 may include one or more weight sensors 420, which may be positioned in the gap 410. The smart spoon 400 may include one or more springs configured to support the food delivery surface 406, as described with respect to the smart fork 300. Accordingly, upon placing food items on the food delivery surface 406, the weight sensor 420 may be depressed by the food delivery surface 406, and may generate a weight measurement based at least in part on the weight or the force applied at the weight sensor 420 by the food delivery surface 406. Surfaces of the smart spoon 400 may be configured to receive one or more inputs and may be color coded. A user may use the surfaces to initiate a food consumption event of particular food items. For example, touching the "bottom" surface of the spoon may indicate a first food item, while a side surface may indicate another food item.

Figure 10:
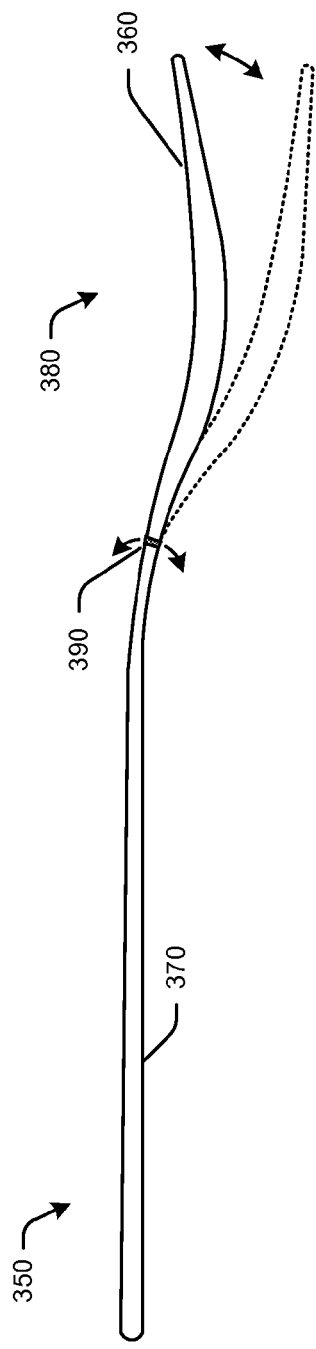
Figure 11:
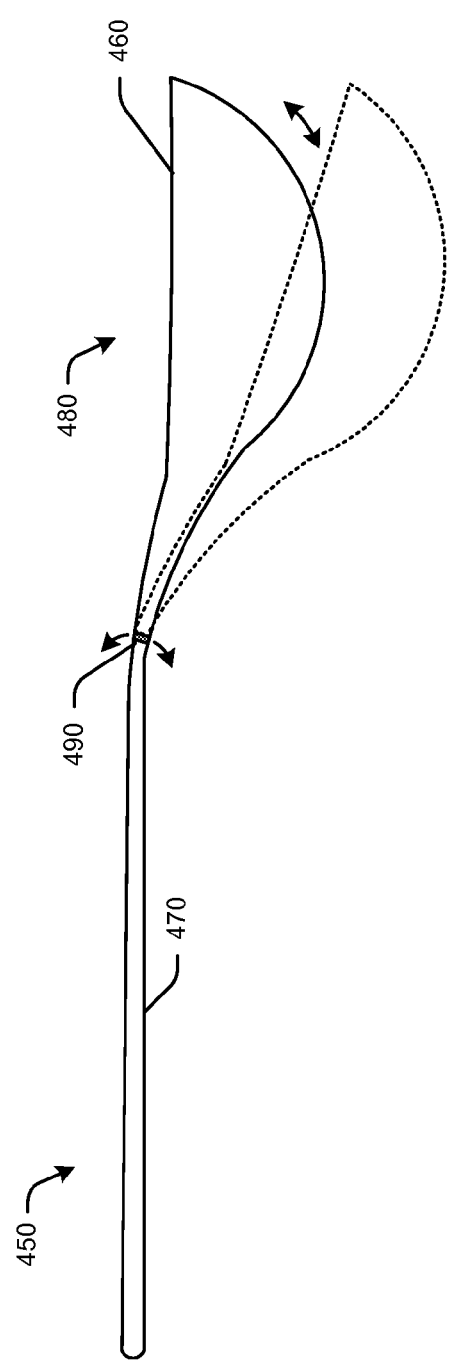

Referring to FIGS. 10 and 11, alternative embodiments of smart utensils are illustrated. In FIG. 10, a smart fork 350 may be configured to determine weight loaded on a food delivery surface 360 by measuring a flex, torque, or force at an intersection, joint, or fulcrum 390 between a handle 370 and food delivery portion 380 of the smart fork 350. Similarly, in FIG. 11, a smart spoon 450 may be configured to determine weight loaded on a food delivery surface 460 by measuring a flex, torque, or force at an intersection, joint, or fulcrum 490 between a handle 470 and food delivery portion 480 of the smart spoon 450.

In an example method that may be implemented by the smart fork 350 and/or the smart spoon 450, a smart utensil may associate the a first surface of a food delivery portion with a first food item and may associate a second surface of the food delivery portion with a second food item. The smart utensil may receive a first input at the first surface and may designate the first food item to an active state in response to the first input. The smart utensil may receive a first indication from a motion sensor indicative of a first gesture, and may initiate a first food consumption event based at least in part on the first gesture. The smart utensil may determine a first weight at the food delivery portion with the weight sensor, and may receive a second indication from the motion sensor indicative of a second gesture. The smart utensil may determine that the first food consumption event is complete based at least in part on the second gesture, and may determine a first calorie amount to associate with the first food consumption event based at least in part on the first weight and calorie information associated with the first food item based on the active state. The smart utensil may send the calorie amount to a user device, for example via a Bluetooth wireless connection.

Although certain embodiments are depicted and described herein, other embodiments of the disclosure may include additional or fewer components and different configurations.

Illustrative Processes and Use Case

Figure 12:
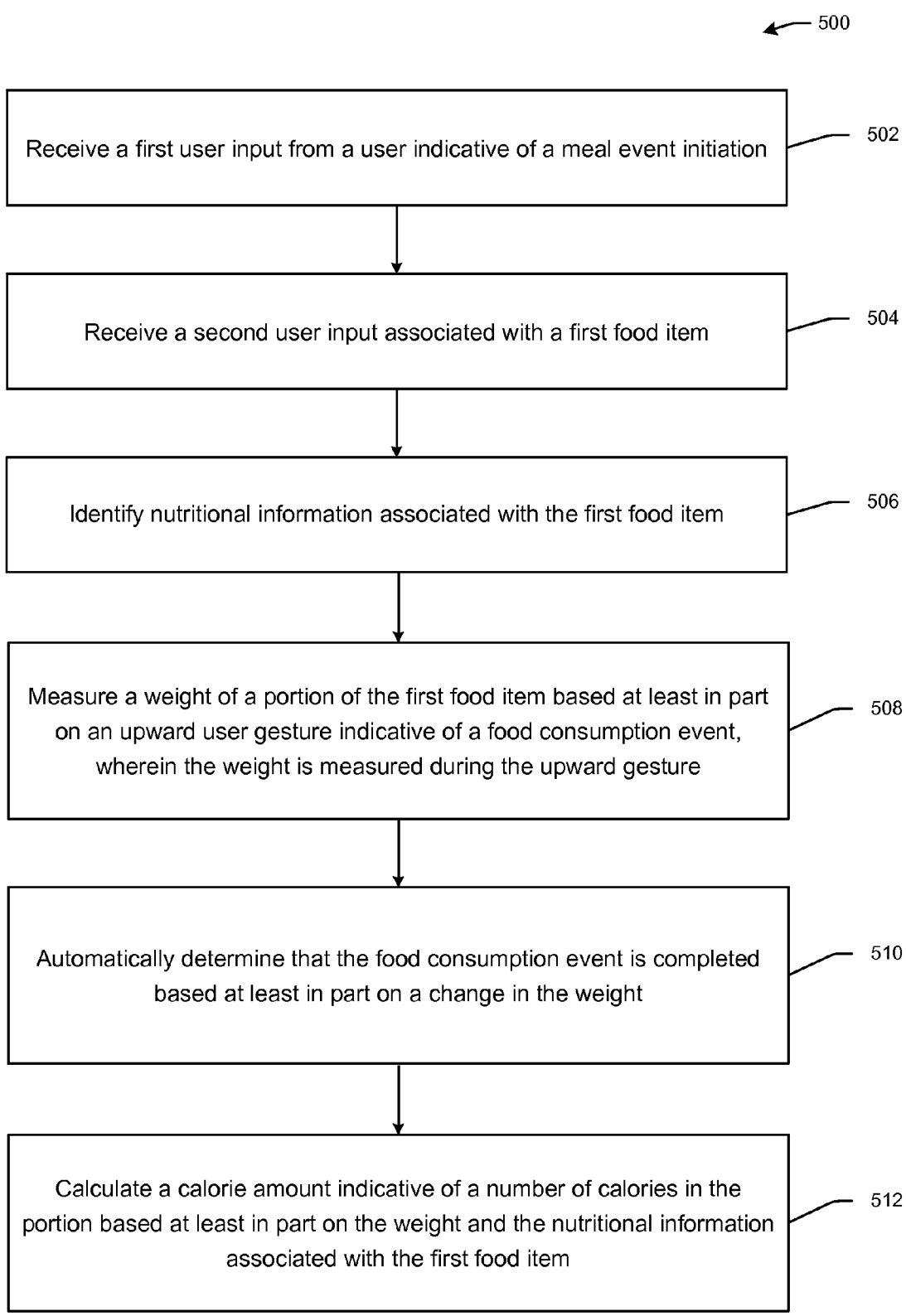
FIGS. 12-13 are process flow diagrams of illustrative methods for dynamic nutrition tracking in accordance with one or more example embodiments of the disclosure.
Figure 13:
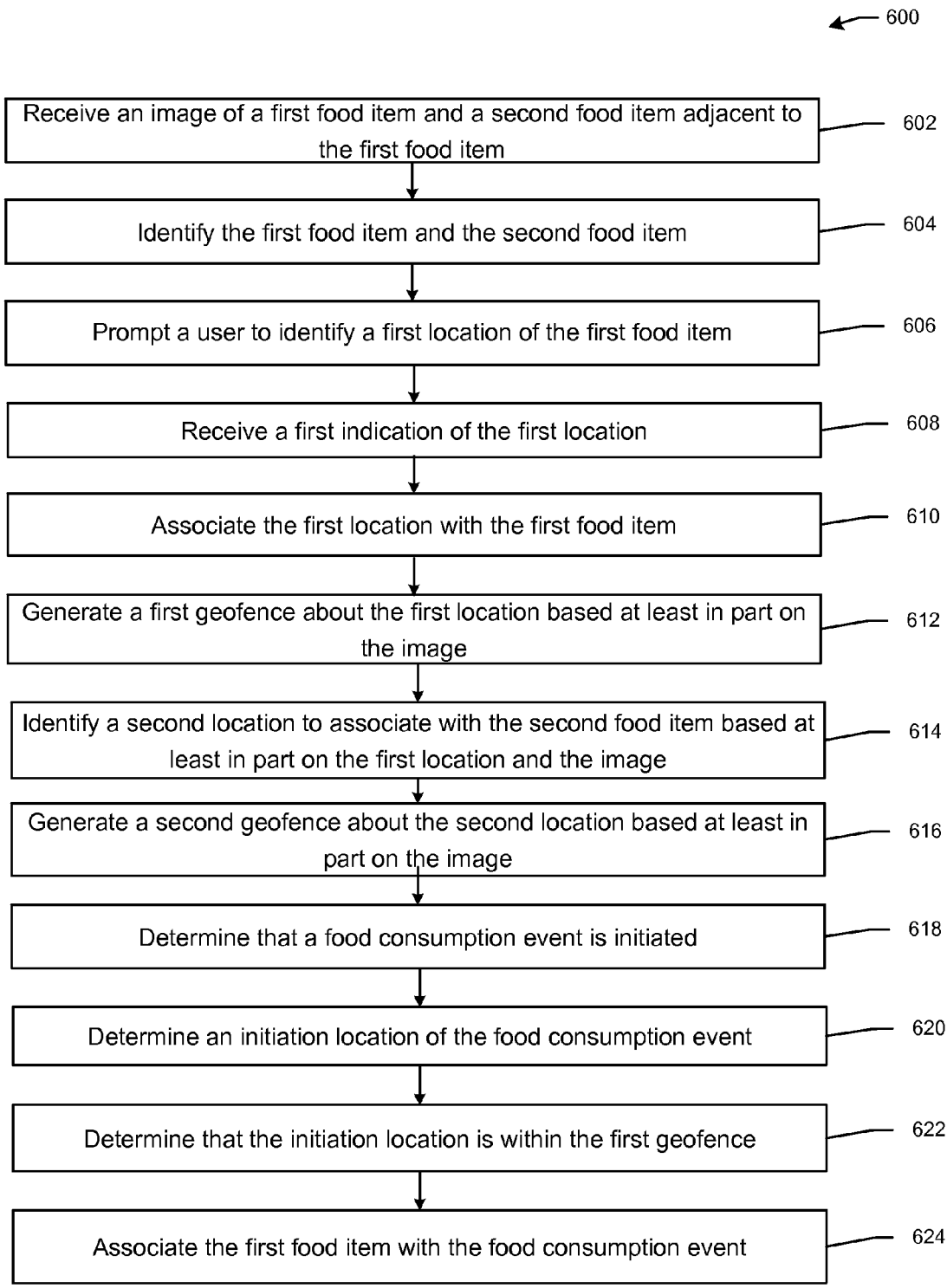
Figure 14:
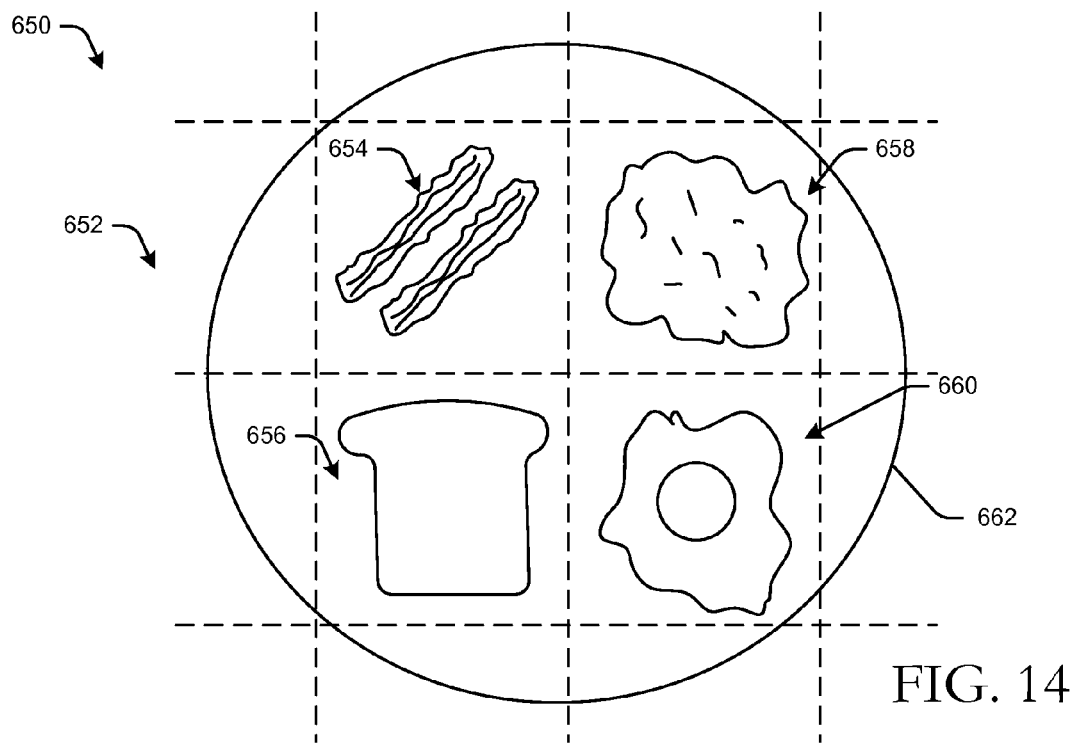
FIGS. 14-15 depict an example use case in accordance with the method illustrated in FIG. 13.
Figure 15:
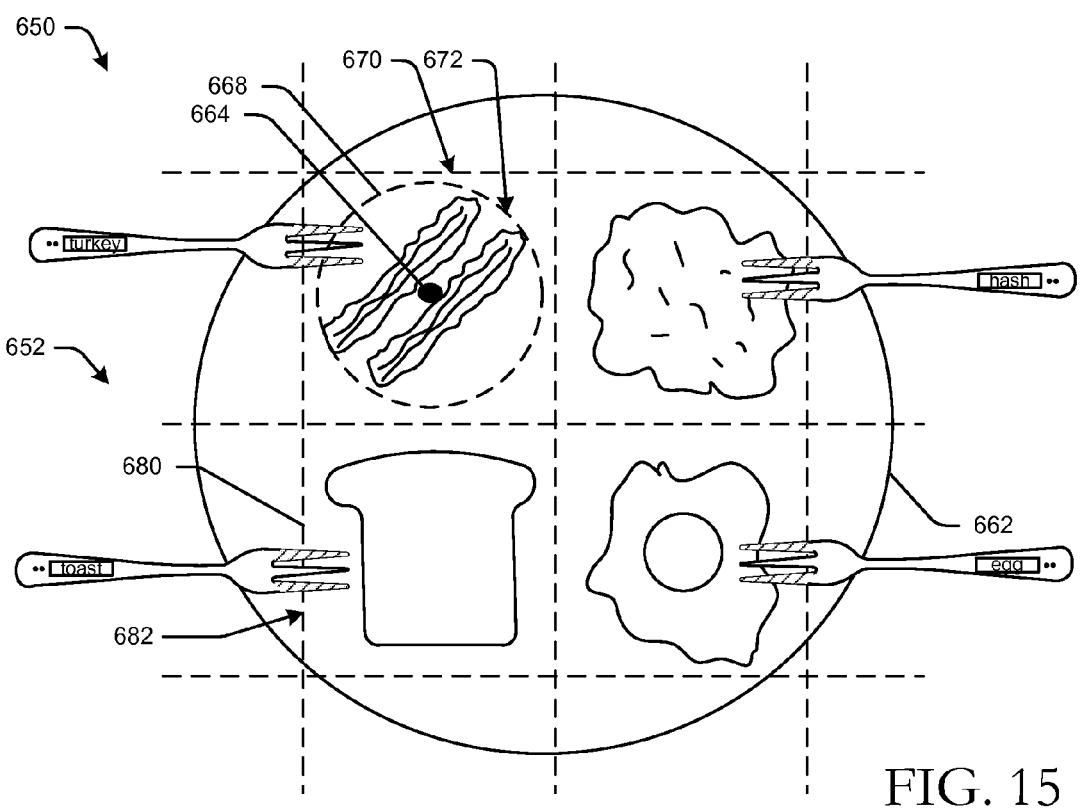
Figure 16:
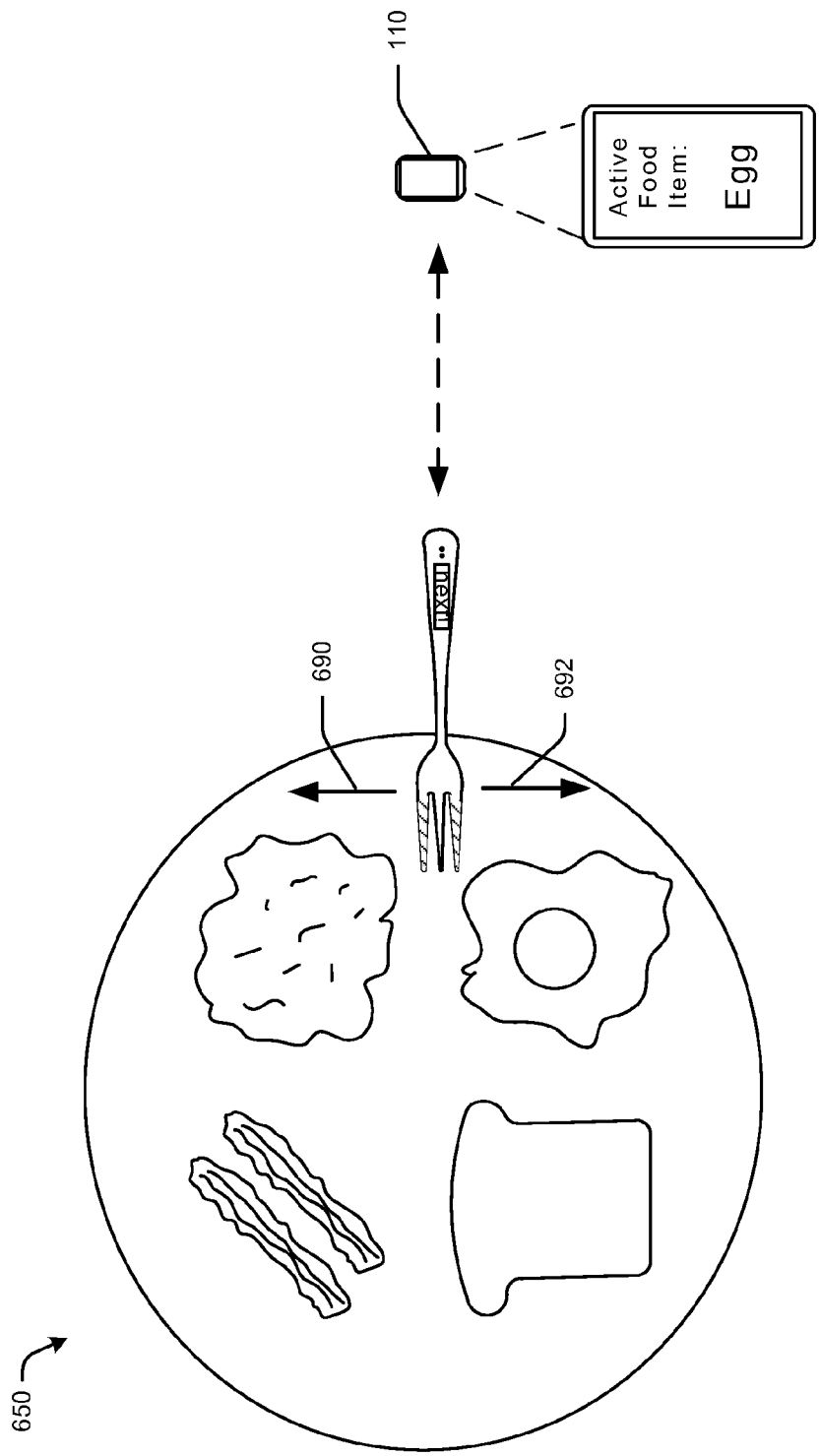
FIG. 16 depicts an example use case of a gesture based food item identification method in accordance with one or more example embodiments of the disclosure.
Figure 17:
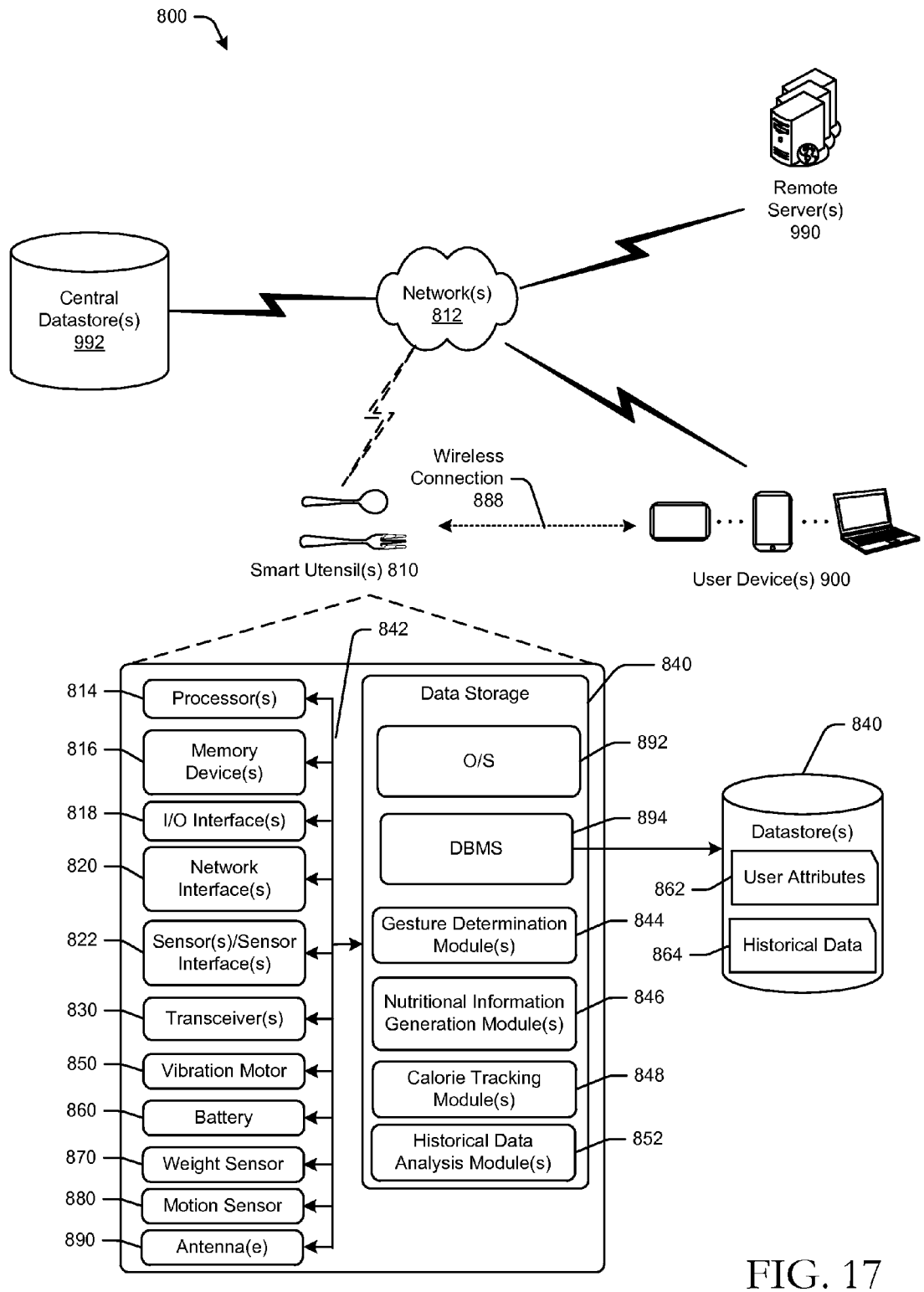
FIG. 17 is a schematic block diagram of an illustrative system in accordance with one or more example embodiments of the disclosure.

FIGS. 12 and 13 depict example methods of dynamic nutritional content information tracking in accordance with one or more embodiments of the disclosure. FIGS. 14-15 depict an example use case of the method of FIG. 13 and will be discussed in conjunction with the method of FIG. 13. FIGS. 16 and 17 illustrate additional use cases in accordance with one or more embodiments of the disclosure.

FIG. 12 depicts an example method 500 of dynamic nutritional content information tracking At block 502 of the method 500 in FIG. 12, computer-executable instructions of one or more module(s) stored on a memory of a user device, which may be a smart utensil as described herein, may be executed to receive a first user input from a user indicative of a meal event initiation. Example device architecture, including modules, is illustrated in FIG. 18. For example, a user may initiate a meal event by performing a gesture and/or selecting an input at the user device. At block 504, computer-executable instructions of one or more module(s) stored on the memory of the user device may be executed to receive a second user input associated with a first food item. For example, a user may associate a surface of the smart utensil or a particular gesture with a particular food item. At block 506, computer-executable instructions of one or more module(s) stored on the memory of the user device may be executed to identify nutritional information associated with the first food item. In one example, the user device may communicate with another device, such as a remote server, to retrieve or otherwise identify nutritional information associated with the first food item. Nutritional information may be generic, such as for chicken, or specific to particular restaurants, and may include point-based or other modified nutrition tracking metrics. At block 508, computer-executable instructions of one or more module(s) stored on the memory of the user device may be executed to measure a weight of a portion of the first food item based at least in part on an upward user gesture indicative of a food consumption event, wherein the weight is measured during the upward gesture. For example, as the user lifts food to his or her mouth, the smart utensil may trigger or activate a load cell configured to generate one or more weight measurements for example at certain predetermined time intervals or continuously of food loaded on the smart utensil. At block 510, computer-executable instructions of one or more module(s) stored on the memory of the user device may be executed to automatically determine that the food consumption event is completed based at least in part on a change in the weight. For example, upon determining that a food consumption event has been initiated and a positive weight measurement has been generated, a subsequent weight measurement of 0 grams may indicate that the user consumed the food. Other embodiments may determine completion of food consumption events based at least in part on gestures (e.g., returning smart utensil to eating surface). At block 512 of the method 500, computer-executable instructions of one or more module(s) stored on the memory of the user device may be executed to calculate a calorie amount indicative of a number of calories in the portion based at least in part on the weight and the nutritional information associated with the first food item. For example, the smart utensil may determine, based on the measured weight and the retrieved or identified nutritional information, a food consumption event includes 19 calories and/or 2 grams of protein.

In some embodiments, the method may include identifying an active food at time of food consumption. In an instance where two separate food items are active, such as if a user is eating milk and cereal, the method may include determining that the first food item is the first active food item and the second food item is the second active food item, and determining that a second food consumption event is complete. The method may include selecting one of the first active food item or the second active food item to associate with the second food consumption event based at least in part on a first user input. For example, the user may input that the user may consume a total of 1 cup of milk and 2 cups of cereal. Embodiments of the disclosure may generate an estimated total weight of the milk and cereal, based at least in part on the respective nutritional information and/or fluid and density properties, and may assign a proportional amount of measured weight to the respective food items, so as to generate an accurate estimation of consumed food during a food consumption event.

Referring to FIGS. 13-15, FIG. 13 depicts an example method 600 of dynamic nutritional content information tracking and FIG. 14 depicts an example use case 650 implementing the method 600. At block 602 of the method 600, computer-executable instructions of one or more module(s) stored on a memory of a user device, which may be a smart utensil as described herein, may be executed to receive an image of a first food item and a second food item adjacent to the first food item. In FIG. 14, an example image 652 is illustrated with a first food item 654, a second food item 656, a third food item 658, and a fourth food item 660. The food items 654, 656, 658, 660 may be positioned on an eating surface, such as plate 662.

At block 604 of the method 600, computer-executable instructions of one or more module(s) stored on the memory of the user device may be executed to identify the first food item and the second food item. In FIG. 14, the user device may perform image recognition or may facilitate analysis of the image 652 by a remote server or other computer device to identify the respective food items. Upon analyzing the image 652, or upon receiving results of an image analysis performed on the image 652, the user device may identify the first food item 654 as turkey bacon, the second food item 656 as toast, the third food item 658 as potatoes, and the fourth food item 660 as egg. In some embodiments, users may be prompted to draw or place (e.g., drag and drop, etc.) a grid around certain food items to facilitate food item identification.

At block 606 of the method 600, computer-executable instructions of one or more module(s) stored on the memory of the user device may be executed to prompt a user to identify a first location of the first food item. Referring to FIG. 15, the user device may prompt the user to identify a first location of the first food item 654. In response, the user may position the smart utensil at or near a center 664 of the turkey bacon 654. In other embodiments, the user may tap or select the food item on a display presenting the image 652. In some embodiments, users may tap food items at a display of a user device, tap a center of a food eating surface, tap a center of a food item, draw around a food eating surface, draw around a food item, or a combination thereof, so as to facilitate a calibration of embodiments of the disclosure.

At block 608 of the method 600, computer-executable instructions of one or more module(s) stored on the memory of the user device may be executed to receive a first indication of the first location. In FIG. 15, the user may indicate that the smart utensil is positioned at the center 664 of the turkey bacon 654, or the location of the smart utensil may be automatically determined. In some embodiments, the user may move the smart utensil about a perimeter 668 of the turkey bacon 654 so as to establish a virtual boundary around the turkey bacon 654, relative to the other food items.

At block 610 of the method 600, computer-executable instructions of one or more module(s) stored on the memory of the user device may be executed to associate the first location with the first food item. In FIG. 15, the smart utensil may associate a first region 670 of the plate 662 with turkey bacon 654.

At block 612 of the method 600, computer-executable instructions of one or more module(s) stored on the memory of the user device may be executed to generate a first geofence about the first location based at least in part on the image. In FIG. 15, the user device may generate a first geofence 672 about the turkey bacon 654 based at least in part on the center 664 of the turkey bacon 654 and/or the boundary or perimeter 668 indicated by the user. While illustrated as a circular boundary, the perimeter 668 may be any geometry and related geofence, such as rectangular or freeform boundaries. In some instances, the user device may generate the first geofence 672 by locating the center 664, as indicated by the user, and then generating an estimated surface area of the plate 662 covered by the turkey bacon 654 based at least in part on the image analysis. The user device may further consider factors such as plate size in generating geofences. User inputs of grids or other inputs may be converted to geofence coordinates to generate geofences in some example embodiments. In some embodiments, the center 664 may not need to be identified, and the first geofence 672 may be generated based on the image analysis, a user drawing a boundary of the geofence around a food item, or another factor.

At block 614 of the method 600, computer-executable instructions of one or more module(s) stored on the memory of the user device may be executed to identify a second location to associate with the second food item based at least in part on the first location and the image. For example, in FIG. 15, a second location 680 may be associated with the toast 656 based at least in part on the image analysis and/or the first location. In some embodiments, the user may identify the second location 680 by moving the smart utensil about the edge or perimeter of the toast 656 or the area surrounding the toast 656.

At block 616 of the method 600, computer-executable instructions of one or more module(s) stored on the memory of the user device may be executed to generate a second geofence about the second location based at least in part on the image. In FIG. 15, the user device may generate a second geofence 682 about the toast 656 based at least in part on the image analysis and/or the center 664 of the turkey bacon 654. In some embodiments, the second geofence 682 may be generated by a user drawing an imaginary line about a perimeter or around the toast 656 with the utensil or identifying a center of food or a food eating surface.

At block 618 of the method 600, computer-executable instructions of one or more module(s) stored on the memory of the user device may be executed to determine that a food consumption event is initiated. For example, a food consumption event may be initiated by a certain gesture or input at the user device.

At block 620 of the method 600, computer-executable instructions of one or more module(s) stored on the memory of the user device may be executed to determine an initiation location of the food consumption event. In FIG. 15, for example, the user device may determine an initiation location for a food consumption event indicated by a location where the user initially raises or starts to raise a smart utensil or user device away from the plate 662, or by another input.

At block 622 of the method 600, computer-executable instructions of one or more module(s) stored on the memory of the user device may be executed to determine that the initiation location is within the first geofence. In FIG. 15, for example, the user device may determine the initiation location for a food consumption event is within the first geofence 672. In one example, embodiments may compare coordinates or distances based on location feedback from the device or other input.

At block 624 of the method 600, computer-executable instructions of one or more module(s) stored on the memory of the user device may be executed to associate the first food item with the food consumption event. In FIG. 15, for example, the user device may associate the food consumption event with the turkey bacon 654 and may therefore use the nutritional information associated with the turkey bacon 654 in generating calorie and nutrition information for the food consumption event.

The method 600 may therefore facilitate identification of food items that the user may eat, and may facilitate determination and generation of nutritional information for food consumption events, and therefore for meal events, with minimal and/or passive interaction with the user. The user may initiate the system and identify locations of food items, and may proceed to consume the food items without actively indicating which food items are being consumed during respective food consumption events. In FIG. 16, an example a user may identify the potatoes 658 by performing a gesture 690 away from the user towards the potatoes 658 to move the potatoes to an active state. Similarly, gesture 692 towards the user may indicate intended consumption of the egg 660 and may move egg 660 to an active state.

Embodiments of the disclosure may further analyze historical data associated with a user to generate predictions of food items and to generate information on eating patterns of a user. For example, if a user routinely eats dessert items first and vegetables last during a meal event, embodiments of the disclosure may generate a recommendation for the user to eat the vegetables first or to reduce the amount of dessert consumed before eating some or all of the vegetables. In one example method of determining predicted food items, embodiments of the disclosure may determine a frequency at which a first food item is in an active state, and may determine that the frequency meets a prediction threshold. For example, a predication may be generated only after the user has consumed a food item at five different instances. Upon determining that the prediction threshold is met, embodiments may generate an average time of day at which the first food item is in the active state. For example, if the user consumes the item between 7:00 pm and 9:00 pm, the average time of day may be an evening time. Embodiments may prompt the user to designate the first food item to the active state at the average time day at a subsequent day, so as to reduce user interaction and active selection of the food item. A confidence interval associated with the prediction may be increased each time the user approves or verifies the prediction. Verification can be silent, in that the user does not make a change to the predicted food item.

Another example method in accordance with one or more embodiments of the disclosure may include identifying a first gesture indicative of a commencement of a first meal event including a first food item identifier associated with a first food item and a second food item identifier associated with a second food item. The method may include designating the first food item as a first active food item, identifying a second gesture indicative of a first consumption event during which a first portion of food of the first meal event is to be consumed, and triggering a first weight measurement based at least in part on the second gesture. The method may include generating a first weight of the first portion based at least in part on the first weight measurement, determining that the first food item is the first active food item, and determining that the first consumption event is complete based at least in part on a third gesture. The method may include associating the first food item with the first consumption event, identifying a first nutritional information indicator associated with the first active food item based at least in part on the first food item identifier, wherein the first nutritional information indicator comprises information representative of caloric content of the first active food item, and generating a first consumed calorie amount based at least in part on the first weight and the first nutritional information indicator. The method may include associating the first consumed calorie amount with the first consumption event, determining that the first meal event is complete, and generating a total consumed calorie indicator indicative of a total consumed calorie amount based at least in part on the first consumption event.

The method may further include designating the second food item as a second active food item, identifying a fourth gesture indicative of a second consumption event during which a second portion of food of the first meal event is to be consumed, wherein the fourth gesture is representative of or the same as the second gesture, and triggering a second weight measurement based at least in part on the fourth gesture. The method may further include generating a second weight of the second portion based at least in part on the second weight measurement, determining that the second food item is the second active food item, determining that the second consumption event is complete based at least in part on a fifth gesture representative of the third gesture, and associating the second food item with the second consumption event. The method may further include identifying a second nutritional information indicator associated with the second active food item based at least in part on the second food item identifier, wherein the second nutritional information indicator comprises information representative of caloric content of the second active food item, generating a second consumed calorie amount based at least in part on the second weight and the second nutritional information indicator, and associating the second consumed calorie amount with the second consumption event, wherein the total consumed calorie indicator is based at least in part on the first consumption event and the second consumption event.

One or more operations of the methods 500, 600 or use cases of FIGS. 14-16 may have been described above as being performed by a user device, or more specifically, by one or more program modules, applications, or the like executing on a device. It should be appreciated, however, that any of the operations of methods 500, 600 or use cases of FIGS. 14-16 may be performed, at least in part, in a distributed manner by one or more other devices, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods 500, 600 or use cases of FIGS. 14-16 may be described in the context of the illustrative smart utensil or user device, it should be appreciated that such operations may be implemented in connection with numerous other device configurations.

The operations described and depicted in the illustrative methods and use cases of FIGS. 14-16 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 14-16 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

FIG. 17 is a schematic block diagram of an illustrative system 800 including a smart utensil 810, a user device 900, a remote server 990, and a central datastore(s) 992 at which user information may be stored or retrieved from in accordance with one or more example embodiments of the disclosure. Some embodiments may not include one or more of the illustrated components, or may include additional components. The smart utensil 810 may include any suitable smart utensil configured for food consumption. The user device 900 may include any suitable computing device including, but not limited to, a mobile device such as a smartphone, tablet, e-reader, wearable device, or the like; a desktop computer; a laptop computer; a content streaming device; a set-top box; or the like. The smart utensil 810 may correspond to an illustrative device configuration for the utensils described in earlier FIGS. 1-16.

Components of the system 800 may be configured to communicate via one or more networks 812. Such network(s) 812 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof The smart utensil 810 and the user device 900 may be configured to communicate via wireless communication connection 888, such as a Bluetooth communication protocol. Other communication links between the smart utensil 810 and the user device 900 may include wireless communication in accordance with a suitable communication protocol including, for example, a local area network (LAN) wireless communication protocol such as WiFi, Wi-Fi Direct, or a personal area network (PAN) such as Bluetooth™, BLUETOOTH LE™ protocol, a Near Field Communication (NFC) protocol, and other wireless communication protocols.

In an illustrative configuration, the smart utensil 810 may include one or more processors (processor(s)) 814, one or more memory devices 816 (generically referred to herein as memory 816), one or more input/output ("I/O") interface(s) 818, one or more network interface(s) 820, one or more sensors or sensor interface(s) 822, one or more transceivers 830, and data storage 840. The smart utensil 810 may further include one or more buses 842 that functionally couple various components of the smart utensil 810. The smart utensil 810 may further include one or more vibration motors 850 configured to generate vibrational and/or haptic feedback, one or more batteries 860, one or more weight sensors 870, and/or one or more motion sensors 880. The smart utensil 810 may include one or more antennas 890 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 842 may include at least one of a system bus, a memory bus, an address bus, or a message bus, and may permit exchange of information (e.g., data (including computer-executable code), signaling, etc.) between various components of the smart utensil 810. The bus(es) 842 may include, without limitation, a memory bus or a memory controller, a peripheral bus, an accelerated graphics port, and so forth. The bus(es) 842 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 816 of the smart utensil 810 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 816 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 816 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 840 may include removable storage and/or non-removable storage including, but not limited to, magnetic storage, optical disk storage, and/or tape storage. The data storage 840 may provide non-volatile storage of computer-executable instructions and other data. The memory 816 and the data storage 840, removable and/or non-removable, are examples of computer-readable storage media (CRSM) as that term is used herein.

The data storage 840 may store computer-executable code, instructions, or the like that may be loadable into the memory 816 and executable by the processor(s) 814 to cause the processor(s) 814 to perform or initiate various operations. The data storage 840 may additionally store data that may be copied to memory 816 for use by the processor(s) 814 during the execution of the computer-executable instructions. Moreover, output data generated as a result of execution of the computer-executable instructions by the processor(s) 814 may be stored initially in memory 816, and may ultimately be copied to data storage 840 for non-volatile storage.

More specifically, the data storage 840 may store one or more operating systems (O/S) 892; one or more database management systems (DBMS) 894; and one or more program modules, applications, or the like such as, for example, one or more gesture determination modules 844, one or more nutritional information generation modules 846, one or more calorie tracking modules 848, and one or more historical data analysis modules 852. Any of the program modules may include one or more sub-modules. Any of the modules depicted in FIG. 17 may include computer-executable code, instructions, or the like that may be loaded into the memory 816 for execution by one or more of the processor(s) 814. Further, any data stored in the data storage 840 may be loaded into the memory 816 for use by the processor(s) 814 in executing computer-executable code. In addition, any data potentially stored in one or more datastore(s) 840 may be accessed via the DBMS 894 and loaded in the memory 816 for use by the processor(s) 814 in executing computer-executable code. In the illustrated example, the datastores 840 may include user attributes 862 representative of a user of the smart utensil 810. User attributes 862 may include one or more indicators of a user account, a user age or age range, weight, targets, goals, and other user attributes. The datastores 840 may include historical data 864, which may include user meal event history, food consumption event history, determined trends, and other information, such as food item selections, goals, targets, or settings and the like.

The processor(s) 814 may be configured to access the memory 816 and execute computer-executable instructions loaded therein. For example, the processor(s) 814 may be configured to execute computer-executable instructions of the various program modules of the smart utensil 810 to cause or facilitate various operations to be performed in accordance with one or more embodiments of the disclosure. The processor(s) 814 may include any suitable processing unit capable of accepting data as input, processing the input data in accordance with stored computer-executable instructions, and generating output data. The processor(s) 814 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 814 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 814 may be capable of supporting any of a variety of instruction sets.

The one or more vibration motors 850 may be any vibration motor configured to generate vibrational or haptic feedback. The battery 860 may be an energy storage device configured to provide energy or otherwise power the smart utensil 810. The battery 860 may be any suitable type of battery including, but not limited to, wet cells, dry cells, lead-acid, lithium, lithium hydride, lithium ion, or the like, at any suitable voltage and/or output current. In certain embodiments, the battery 860 may be rechargeable and may be recharged by one or more other power sources. The battery 860 may be configured to receive and store energy.

The weight sensor 870 may be any weight sensor, examples of which are described herein, configured to measure a weight or force loaded at a portion of or all of the smart utensil 810. The motion sensor 880 may be configured to determine a device orientation and position, and to identify gestures performed with the smart utensil. Motion sensors may include one or more of, or a combination of, a gyroscope, accelerometer, barometer, compass, and other sensors.

Referring now to functionality supported by the various program modules depicted in FIG. 17, the gesture determination module(s) 844 may include computer-executable instructions, code, or the like that responsive to execution by one or more of the processor(s) 814 may perform functions including, but not limited to, identifying indications of gestures performed based at least in part on sensor feedback from one or more sensors, associate certain gestures with certain functions and/or food items, initiate and/or complete food consumption events and meal events, and other gesture based functions.

The nutritional information generation module(s) 846 may include computer-executable instructions, code, or the like that responsive to execution by one or more of the processor(s) 814 may perform functions including, but not limited to, identify nutritional information associated with one or more food items, determine calories and other nutritional information for portions of food loaded on the smart utensil 810, communicate with other devices to receive information, and other functions.

The calorie tracking module(s) 848 may include computer-executable instructions, code, or the like that responsive to execution by one or more of the processor(s) 814 may perform functions including, but not limited to, generating total calorie information, associating calorie information with food consumption events and/or meal events, tracking consumed calories against desired targets and goals, generating notifications, alerts, and other feedback related to consumed food, and other functions.

The historical data analysis module(s) 852 may include computer-executable instructions, code, or the like that, responsive to execution by one or more of the processor(s) 814, may perform functions including, but not limited to, analyze historical food consumption and meal event data to generate trends, generate food item predictions, generate recommended targets, and other information.

Referring now to other illustrative components depicted as being stored in the data storage 840, the O/S 892 may be loaded from the data storage 840 into the memory 816 and may provide an interface between other application software executing on the smart utensil 810 and hardware resources of the smart utensil 810. More specifically, the O/S 892 may include a set of computer-executable instructions for managing hardware resources of the smart utensil 810 and for providing common services to other application programs (e.g., managing memory allocation among various application programs). In certain example embodiments, the O/S 892 may control execution of the other program modules to dynamically enhance characters for content rendering. The O/S 892 may include any operating system now known or which may be developed in the future including, but not limited to, any server operating system, any mainframe operating system, or any other proprietary or non-proprietary operating system.

The DBMS 894 may be loaded into the memory 816 and may support functionality for accessing, retrieving, storing, and/or manipulating data stored in the memory 816 and/or data stored in the data storage 840. The DBMS 894 may use any of a variety of database models (e.g., relational model, object model, etc.) and may support any of a variety of query languages. The DBMS 894 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the smart utensil 810 is a mobile device, the DBMS 894 may be any suitable light-weight DBMS optimized for performance on a mobile device.

Referring now to other illustrative components of the smart utensil 810, one or more input/output (I/O) interface(s) 818 may be provided that may facilitate the receipt of input information by the smart utensil 810 from one or more I/O devices as well as the output of information from the smart utensil 810 to the one or more I/O devices. The I/O devices may include, for example, one or more user interface devices that facilitate interaction between a user and the smart utensil 810 including, but not limited to, a display, a keypad, a pointing device, a control panel, a touch screen display, a gesture capture or detection device, a remote control device, a microphone, a speaker, and so forth. The I/O devices may further include, for example, any number of peripheral devices such as data storage devices, printing devices, and so forth.

The smart utensil 810 may further include one or more network interface(s) 820 via which the smart utensil 810 may communicate with any of a variety of other systems, platforms, networks, devices, and so forth. Such communication may occur via any of the types of networks previously described.

The antenna(s) 890 may include any suitable type of antenna depending, for example, on the communications protocols used to transmit or receive signals via the antenna(s) 890. Non-limiting examples of suitable antennas may include directional antennas, non-directional antennas, dipole antennas, folded dipole antennas, patch antennas, multiple-input multiple-output (MIMO) antennas, or the like. The antenna(s) 890 may be communicatively coupled to one or more transceivers 830 or radio components to which or from which signals may be transmitted or received.

As previously described, the antenna(s) 890 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 890 may additionally, or alternatively, include a Wi-Fi antenna configured to transmit or receive signals in accordance with established standards and protocols, such as the IEEE 802.11 family of standards, including via 2.4 GHz channels (e.g. 802.11b, 802.11g, 802.11n), 5 GHz channels (e.g. 802.11n, 802.11ac), or 60 GHZ channels (e.g. 802.11ad). In alternative example embodiments, the antenna(s) 890 may be configured to transmit or receive radio frequency signals within any suitable frequency range forming part of the unlicensed portion of the radio spectrum.

The antenna(s) 890 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 830 may include any suitable radio component(s) for—in cooperation with the antenna(s) 890—transmitting or receiving radio frequency (RF) signals in the bandwidth and/or channels corresponding to the communications protocols utilized by the smart utensil 810 to communicate with other devices. The transceiver(s) 830 may include hardware, software, and/or firmware for modulating, transmitting, or receiving—potentially in cooperation with any of antenna(s) 890—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 830 may further include hardware, firmware, or software for receiving GNSS signals. The transceiver(s) 830 may include any known receiver and baseband suitable for communicating via the communications protocols utilized by the smart utensil 810. The transceiver(s) 830 may further include a low noise amplifier (LNA), additional signal amplifiers, an analog-to-digital (A/D) converter, one or more buffers, a digital baseband, or the like.

Although illustrated as including a transceiver/Bluetooth radio 830, any other radio, such as a WiFi radio, configured to facilitate wireless communication may be included in the smart utensil 810 and/or the user device 900. Although each of these components is shown in the illustrated embodiment, other embodiments may include additional or fewer components. The Bluetooth radio 830 of the smart utensil 810, in cooperation with the antenna 890, may be configured to transmit or receive radio frequency (RF) signals in the bandwidth and/or channels corresponding to the communications protocols utilized by the user device 900. The transceiver or radio 830 may include hardware, software, and/or firmware for modulating, transmitting, or receiving, potentially in cooperation with any of antenna(s) 890, communications signals according to any of the communications protocols discussed above including, but not limited to, one or more Bluetooth and/or Bluetooth LE™ wireless communication protocols, Wi-Fi and/or Wi-Fi direct protocols, as standardized by the IEEE 802.11 standards, one or more non-Wi-Fi protocols, or one or more cellular communications protocols or standards.

The sensor(s)/sensor interface(s) 822 may include or may be capable of interfacing with any suitable type of sensing device such as, for example, inertial sensors, force sensors, motion sensors, thermal sensors, cameras, and so forth including the motion sensor and weight sensors described herein. Example types of inertial sensors may include accelerometers (e.g., MEMS-based accelerometers), gyroscopes, and so forth. In one example, the user devices described herein may include the motion sensor 880 configured to detect an event corresponding to device motion via the motion sensor 880. Such events may be continuous motion for a certain length of time, which may indicate that the user device is not stationary (e.g., the user using the user device is in a car, etc.). The sensor(s) 880 may further be configured to determine an orientation of the device, and, in some embodiments, associate locations or positions with certain food items.

Any of the components illustrated at the smart utensil 810 in FIG. 17 may be on the user device 900 in some embodiments, such as the modules, transceiver, etc., so as to facilitate computing at the user device 900 and wireless communication between the user device 900 and the smart utensil.

It should be appreciated that the program modules, applications, computer-executable instructions, code, or the like depicted in FIG. 17 as being stored in the data storage 840 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the smart utensil 810, and/or hosted on other computing device(s) accessible via one or more networks, may be provided to support functionality provided by the program modules, applications, or computer-executable code depicted in FIG. 17 and/or additional or alternate functionality. Further, functionality may be modularized differently such that processing described as being supported collectively by the collection of program modules depicted in FIG. 17 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 17 may be implemented, at least partially, in hardware and/or firmware across any number of devices.

It should further be appreciated that the smart utensil 810 may include alternate and/or additional hardware, software, or firmware components beyond those described or depicted without departing from the scope of the disclosure. More particularly, it should be appreciated that software, firmware, or hardware components depicted as forming part of the smart utensil 810 are merely illustrative and that some components may not be present or additional components may be provided in various embodiments. While various illustrative program modules have been depicted and described as software modules stored in data storage 840, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   receiving, by one or more computer processors coupled to at least one memory, a first input indicative of an initiation of a food consumption event;
   triggering a load cell configured to detect a first weight measurement of a food portion on a food consumption utensil;
   triggering, after a predetermined length of time, the load cell to detect a second weight measurement;
   determining that a difference between the first weight measurement and the second weight measurement meets or exceeds a food consumption interruption threshold; and
   discarding the first weight measurement and the second weight measurement based at least in part on the food consumption interruption threshold.

2. The method of claim 1, further comprising:
   triggering, upon determining that the difference meets the food consumption interruption threshold, the load cell to detect a third weight measurement;
   determining that the third weight measurement is greater than the second weight measurement;
   determining that the food consumption event is complete; and
   using the third weight measurement to determine nutritional information of the food consumption event.

3. The method of claim 2, further comprising:
   identifying a food item associated with the food portion; and
   identifying nutritional information associated with the food item;
   wherein the nutritional information of the food consumption event is based at least in part on the nutritional information associated with the food item and the third weight measurement.

4. The method of claim 2, wherein the first weight measurement is greater than the second weight measurement and the third weight measurement is greater than the second weight measurement.

5. The method of claim 1, further comprising:
   triggering the load cell to detect a third weight measurement;
   determining that the third weight measurement is greater than the second weight measurement;
   determining an elapsed time between the third weight measurement and the second weight measurement is less than a minimum food consumption time interval; and using the third weight measurement to determine nutritional information of the food consumption event.

6. The method of claim 1, wherein the second weight measurement is greater than zero and the first weight measurement is greater than the second weight measurement.

7. A method comprising:
determining, by one or more computer processors coupled to at least one memory, initiation of a food consumption event;
determining a first timestamp at the initiation of the food consumption event;
determining that the food consumption event is complete at a second timestamp;
determining, at a first periodic time interval after the first timestamp, a first weight measurement of a food portion to be consumed;
determining, at a second periodic time interval after the first periodic time interval, a second weight measurement of the food portion to be consumed; and
determining an average weight measurement based at least in part on the first weight measurement and the second weight measurement.

8. The method of claim 7, further comprising:
determining a nutritional content of the food portion based at least in part on the average weight measurement.

9. The method of claim 8, further comprising generating a food item recommendation based at least in part on the nutritional content.

10. The method of claim 7, wherein determining that the food consumption event is complete comprises determining a third weight measurement of the food portion is equal to approximately zero.

11. The method of claim 7, wherein determining that the food portion has been consumed comprises determining that a predetermined length of time has elapsed from the first timestamp.

12. The method of claim 7, wherein determining initiation of a food consumption event comprises:
detecting a motion gesture;
comparing the motion gesture to a set of stored motion gestures;
determining that the motion gesture is within a predefined tolerance of one of the set of stored motion gestures; and
determining that the motion gesture corresponds to a food consumption event.

13. A device comprising:
at least one memory that stores computer-executable instructions;
at least one processor configured to access the at least one memory and execute the computer-executable instructions to:
receive a first input indicative of an initiation of a food consumption event;
trigger a weight measurement device configured to detect a first weight measurement of a food portion on a food consumption utensil;
trigger, after a predetermined length of time, the weight measurement device to detect a second weight measurement;
determine that a difference between the first weight measurement and the second weight measurement meets or exceeds a food consumption interruption threshold; and
discard the first weight measurement and the second weight measurement based at least in part on the food consumption interruption threshold.

14. The device of claim 13, wherein the at least one processor is further configured to access the at least one memory and execute the computer-executable instructions to:
trigger, after determining that the difference meets the food consumption interruption threshold, the weight measurement device to detect a third weight measurement;
determine that the third weight measurement is greater than the second weight measurement;
determine that the food consumption event is complete; and
use the third weight measurement to determine nutritional information of the food consumption event.

15. The device of claim 14, wherein the at least one processor is further configured to access the at least one memory and execute the computer-executable instructions to:
identify a food item associated with the food portion; and
identify nutritional information associated with the food item;
wherein the nutritional information of the food consumption event is based at least in part on the nutritional information associated with the food item and the third weight measurement.

16. The device of claim 14, wherein the first weight measurement is greater than the second weight measurement and the third weight measurement is greater than the second weight measurement.

17. The device of claim 13, wherein the at least one processor is further configured to access the at least one memory and execute the computer-executable instructions to:
trigger the weight measurement device to detect a third weight measurement;
determine that the third weight measurement is greater than the second weight measurement;
determine an elapsed time between the third weight measurement and the second weight measurement is less than a minimum food consumption time interval; and
use the third weight measurement to determine nutritional information of the food consumption event.

18. The device of claim 13, wherein the second weight measurement is greater than zero and the first weight measurement is greater than the second weight measurement.

* * * * *